United States Patent [19]

Houvig

[11] 4,303,984
[45] Dec. 1, 1981

[54] SENSOR OUTPUT CORRECTION CIRCUIT
[75] Inventor: Felix J. Houvig, Wayne, Pa.
[73] Assignee: Honeywell Inc., Minneapolis, Minn.
[21] Appl. No.: 104,590
[22] Filed: Dec. 14, 1979
[51] Int. Cl.³ ............................................. G06F 15/20
[52] U.S. Cl. .................................. 364/571; 364/558
[58] Field of Search ....................... 364/558, 571, 573

[56] References Cited
U.S. PATENT DOCUMENTS

| | | | |
|---|---|---|---|
| 3,878,373 | 4/1975 | Blum | 364/571 X |
| 4,089,058 | 5/1978 | Murdock | 364/571 |
| 4,091,543 | 5/1978 | Lapeyre | 364/571 X |
| 4,161,782 | 7/1979 | McCracken | 364/573 X |
| 4,169,380 | 10/1979 | Mansfield et al. | 364/571 X |
| 4,198,677 | 4/1980 | Brunner et al. | 364/571 |

*Primary Examiner*—Edward J. Wise
*Attorney, Agent, or Firm*—Laurence J. Marhoefer; Lockwood D. Burton; Mitchell J. Halista

[57] ABSTRACT

A sensor correction circuit uses a programmable read only memory (PROM) for storing characterizing information for an associated sensor or transducer. The information is stored in the 1×2048 bit configuration. The programmable read-only memory (PROM) has its parallel outputs connected to corresponding inputs of a 2048 bit shift register. The programmable read-only memory and the shift register are located in an electronic circuit housing, along with a power supply and sensor signal handling electronics, attached to the sensor structure to form an integral package therewith. An isolation interface is mounted on the housing and is connected between the circuit within the housing and an external data processing and interrogating system which may include a microprocessor. The programmable read-only memory is used to store sensor characterizing information for providing sensor correction data to the microprocessor controlled data processing system and to supply this information upon demand by the data processing system to the shift register for read-out through the isolation interface to the interrogating data processing system. The isolation interface may include signal isolators used to transmit the signals for controlling the programmable read-only memory and the shift register and for supplying power to the power supply to energize the shift register and the sensor signal handling electronics.

12 Claims, 1 Drawing Figure

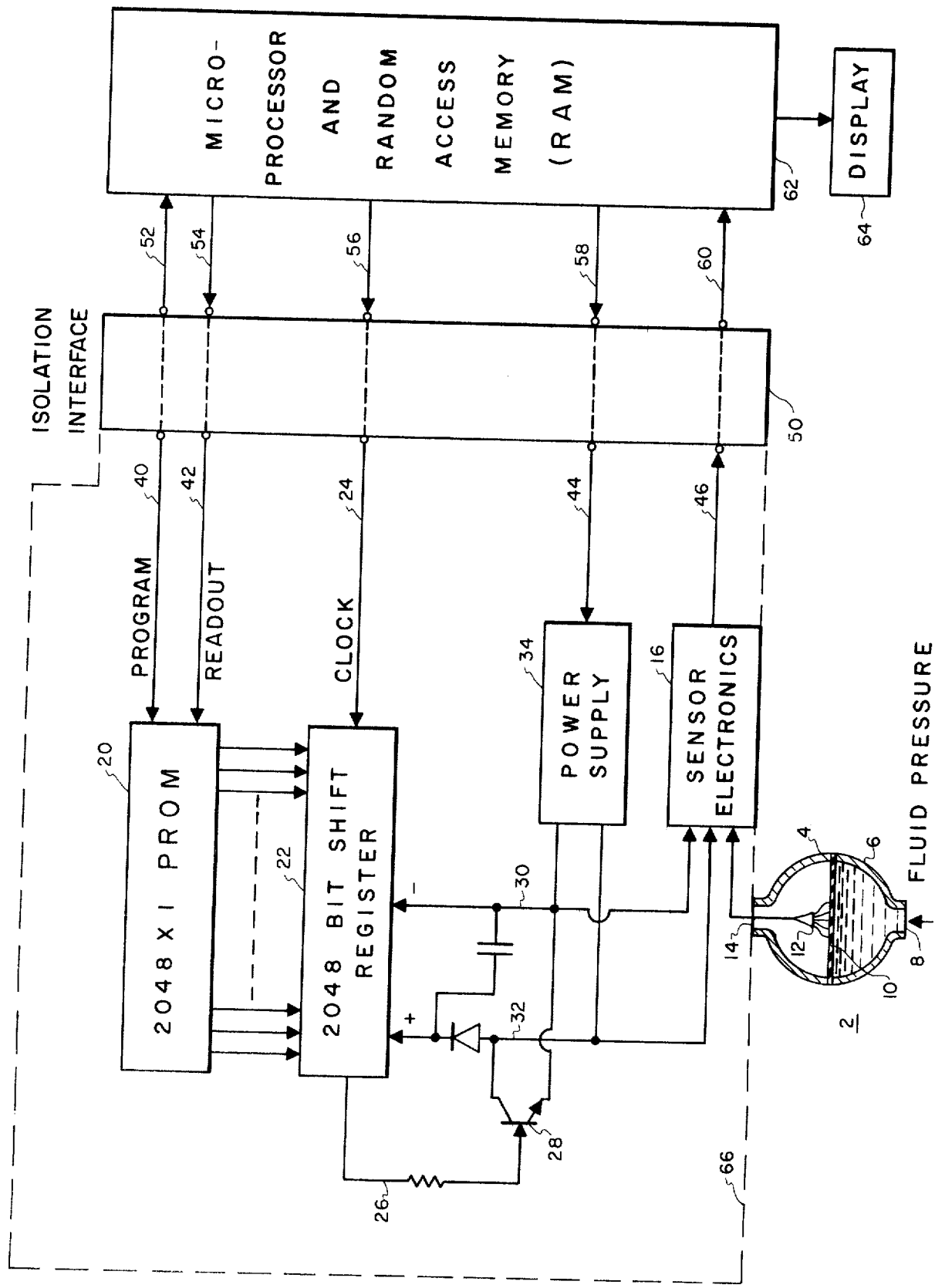

SENSOR OUTPUT CORRECTION CIRCUIT

BACKGROUND OF THE INVENTION

1. Field of the Invention

The present invention relates to transducers. More specifically, the present invention is directed to a signal correction circuit for a transducer output signal.

2. Description of the Prior Art

Many of the transducers or sensors used in industrial process control to monitor various process variables, e.g., temperatures, pressure, etc., produce output signals which are not directly usable, e.g., they may be non-linear, and, hence, must be linearized before being used to provide an associated process control system to produce control functions for the industrial process being monitored. Examples of prior art sensor signal correction circuits include linearization circuits for linearizing outputs of such non-linear transducers by having the linearizing circuit operating on the actual sensor output signal to convert it to a linearized value as is shown in U.S. Pat. No. 3,748,446 and by using stored tables of linearized sensor output on information which is selectively read-out substituted for the transducer output signal as shown in U.S. Pat. No. 2,987,704. The major problem associated with such prior art structures is the lack of specific correlation directly between the linearization information and the transducer. For example, the information stored in a look-up table in a memory device, e.g., magnetic drum, random access memory, etc., is not directly physically related to a particular transducer and may be incorrectly associated with a transducer particularly when the transducer is replaced. Accordingly, it would be advantageous to have such characterizating, or correction, information stored or physically located with the transducer whereby the information is always physically correlated to the particular transducer and is automatically changed when the transducer is replaced. However, to store the aforesaid look-up table data storage type of apparatus as shown in the aforesaid prior art within the physical structure of the transducer is basically impractical owing to the lack of physical space available and the number of electrical connections to be made between such a combined structure and an external monitoring system, which may include a digital computer, would be physically and economically unfeasible. Finally, such a combined system would require a large power supply or power input in order to energize the components of such a data storage system even if such a system could somehow be accommodated within a greatly enlarged sensor housing. Accordingly, it would be advantageous to provide a system for storing characterizing information for a sensor which is compatible with the internal space normally associated with the sensor housing and which requires only a minimum of electrical connections and power input thereto.

SUMMARY OF THE INVENTION

An object of the present invention is to provide an improved sensor output signal correction circuit physically compatible with a sensor housing.

In accomplishing this and other objects, there has been provided, in accordance with the present invention, a sensor output signal correction circuit including a programmable read-only memory which is used to store sensor characterizing information and a shift register having the register stages connected to receive in parallel the information stored in the memory. An output from the shift register serially provides the digital information transferred from the memory to an interface output circuit between the correction data circuit and a data processing system. The interface is also used to transfer power to energize the shirt register and to provide a data signal path between the sensor and the data processing system.

BRIEF DESCRIPTION OF THE DRAWING

A better understanding of the present invention may be had when the following detailed description is read in connection with the associated drawing in which the single FIGURE is a block diagram of an example of a sensor output signal correction circuit embodying the present invention.

DESCRIPTION OF THE PREFERRED EMBODIMENT

Referring to the signal figure drawing in more detail, there is shown an example of a sensor output signal correction circuit for providing correction information for the output signal of a physical condition monitoring sensor an example of which is illustrated in the drawing as a fluid pressure sensor 2. This sensor 2 is located within a fluid-tight housing including a pair of housing elements 4 and 6. The housing elements 4 and 6 are arranged to form a fluid-tight structure having a fluid pressure inlet port 8 located in one of the housing sections, e.g., section 6. A semi-conductor diaphragm 10 is located between the housing elements 4, 6 and is arranged to provide an output signal representative of differential pressure applied thereto in a manner well-known in the art as is shown in U.S. Pat. No. 3,559,488 of J. A. Weaver. The electrical connections to the semi-conductor sensor diaphragm 10 are provided by electrical wires 12 which are brought out through a port 14 in the other sensor housing element, e.g., section 4, to a circuit for amplifying and otherwise conditioning the sensor output signal for subsequent transmission to an external receiver shown as sensor electronics 16.

Located adjacent to the sensor electronics 16 is a programmable read-only memory, hereinafter identified as a PROM, 20. The PROM 20 is arranged as a single level storage element with sufficient capacity for storing the characterizing, i.e., correction, information to be associated with the sensor 2, e.g., a 2048×1 PROM. A shift register 22 having the same number of shift stages as the storage capacity of the PROM 20, e.g., a 2048 bit capacity, is connected in parallel to the PROM 20, i.e., each storage cell in the PROM 20 is connected to a respective stage in the shift register 22. A clock signal input line 24 to the shift register is used to apply clock signals for serially shifting the data stored in the shift register to a shift register output line 26. The serial data from the shift register 22 is sequentially applied to the base electrode of a transistor 28 to be used to develop an output signal from the shift register suitable for communication to an external data processing and process monitoring and control system, hereinafter described. Specifically, the transistor 28 has its collector and emitter electrodes connected across the positive and negative output lines 30, 32, of a power supply 34. These positive and negative power supply output lines 30, 32 are also connected to the sensor electronic 16 and to the shift register 22 to supply electrical power thereto.

The PROM 20 has a programming input line 40 associated therewith as well as a read-out control line 42. Further, the power supply 34 has a power input line 44 and the sensor electronics 16 has an output signal line 46 associated therewith. These five signal lines 24, 40, 42, 44, and 46 are connected to one side of a signal isolation interface 50 which provides electrical conductive isolation between its input and output using well-known isolation devices, e.g., acoustic, optic, inductive, etc. The other side of the interface 50 is, in turn, connected by five signal lines 52, 54, 56, 58, 60 to a signal analyzing and supply system which can include a conventional microprocessor and random access memory (RAM) 62. A display apparatus 64, e.g., a cathode-ray tube (CRT) display, can be associated with the signal analyzing system 62 to provide a display of the information being stored and processed in the signal analyzing system 62, such displays being well-known in the art.

A housing 66 for the aforesaid circuit elements directly associated with the sensor 2, i.e., the sensor electronics 16, the PROM 20, the shift register 22, the power supply 34 and the other circuit elements and interconnecting leads associated therewith as described above, is arranged to enclose those elements and to be supported on the sensor 2 as an integral structural package therewith. The interface 50 would, then, be mounted on the housing 66 and would provide a means for communicating between the aforesaid plurality of circuit elements located within the housing 66 and the external data processing system 62. It should be noted that the connecting leads 52, 54, 56, 58 and 60 may be of various lengths depending on the proximity of the processing system to the interface 50. Thus, in the case of a portable, or hand-held, processing system 62 those leads may be simply connecting pins on a plug-in connector used to connect the processing system 62 to the interface 50 mounted on the housing 66. On the other hand, in the case of a data processing system 62 located at a distance from the interface 50, the leads 52, 54, 56, 58 and 60 may be relatively long connecting wires either permanently or temporarily, i.e., in the case of a connecting plug, attached to the interface 50. In the case of the hand-held processing system, an operator would have physical access to the isolation interface 50 and would plug, or attach, the system 62 to the interface 50 for interrogating the electronic circuit elements found within the housing 66 to determine the value of the process variable quantity, e.g., pressure, being monitored by the sensor 2.

In operation, the sensor output signal correcting circuit of the present invention is effective to supply a sensor characterizing output signal to a data processing system 62 which data provides to the system 62 a means for correcting, e.g., linearizing, the sensor output signal representing the process variable being monitored. This correction information is stored in the PROM 20 during an initial conventional data storing operation of the PROM 20 which accordingly, relates its stored information to the particular sensor 2 associated therewith. This sensor characterizing, or correction, information is selectively supplied to the PROM 20 supplied to the PROM 20 by any suitable programming technique during the manufacture and testing of the sensor 2. This characterizing information consists of a series of digital words which are stored in the 2048 bit storage cells of the PROM 20. Inasmuch as the PROM 20 can be read out non-destructively, the stored information is retained in the PROM 20 to provide this characterizing information for each read-out of the PROM 20 by the data processing system 62 whereby the output signal from the associated sensor 2 can be properly corrected. Since the PROM 20 is located within the housing 66 physically attached to the sensor 2, any physical relocation of the sensor 2 is accompanied by a concurrent relocation of the PROM 20 with the proper characterizing information stored therein.

When the characterizing information is desired to be read-out from the PROM 20 to provide the correction information for the data processing system 62 which is connected to the interface 50 for receiving output signals from the sensor 2, a read-out signal is supplied from the system 62 on the line 54. The line 54, in turn, applies this signal to the interface 50 for application to the read-out line 42 which is connected to the PROM 20. Upon the application of the read out signal to the PROM 20, the digital bits stored therein are applied in parallel to respective stages of the shift register 22. Subsequently, a clock signal is applied from the system 62 on line 56. Line 56 is effective to apply this clock signal to the isolation interface 50 which, in turn, applies the clock signal to the clock line 24 for application to the shift sequentially clock, or shift, the data stored in the shift register 22 to the output terminal line 26 of the shift register 22. These digital signals, or bits, are serially and individually applied to the base electrode of the transistor 28 to effect its conductivity.

As previously mentioned, the example of the embodiment of the invention shown in the single figure drawing is particularly suitable for use with sonic isolation devices within the isolation interface 50. These sonic devices are used to isolate input and output lines while enabling communication therebetween by means of sonic signals generated by acoustic transducers on an acoustic medium with the input and output lines terminating in the acoustic transducers, such devices being well-known in the art. Thus, the power supply 34 is provided with acoustic communication through the interface 50 between the power input line 58 from the data processing system 62 and the power supply energizing line 44 connected to the output of the interface 50. These acoustic signals are converted to electrical signals and are used to energize the power supply 34 which, in turn, converts the energizing electrical signals to power supply output signals on lines 30 and 32 for powering the shift register and the sensor electronics 16. The aforesaid changes in conductivity of the transistor 28 which is connected across the power supply output lines 30, 32, therefore, provide fluctuations in the power demand of the power supply 34 which fluctuations are reflected back through the interface 50 to the data processing system 62. These electrical fluctuations are sensed by suitable circuits within the data processing system 62 such circuits being well-known in the art. Thus, the digital bits proceeding from the output line of the shift register 22 are effective to produce output signals from the interface 50 which are detected by the data processing system 62. In the case of other types of isolation devices being used in the isolation interface 50, the digital signals from the shift register 22 can be used to provide appropriate and corresponding signals for application through the interface 50 to the data processing system 62, such isolation devices and their energizing and detecting circuits being well-known in the art.

The sensor electronics 16, is arranged to convert in a conventional fashion the output of the sensor 2, which is shown as a differential pressure transducer, to corresponding output signals on a sensor output line 46 for application to the interface 50. An output line 60 from the interface 50 is effective to apply received sensor output signals to the data processing system 62. Thus, an interrogation of sensor 2 by the data processing system 62 would involve a powering of the power supply 34 through the interface 50 to energize the shift register 22 and sensor electronic 16 followed by a read-out signal and clock signal application by the data processing system 62 to the interface 50. This read-out operation would be sensed by the data processing system 62 to provide the characterizing information correlated with the output signals from the sensor 2 attached thereto. This characterizing information could be stored in the random access memory (RAM) of the data processing system 62 for use in correcting the output signals from the sensor electronics 16 which are received via sensor output line 60 by the system 62. The detailed operation of the system 62 would depend on the stored program therein for using the sensor data and, if desired, operating the associated display 64. Since the details of the data handling operation of the data processing system 62 do not form a part of the present invention, a further discussion thereof is believed to be unnecessary for a complete understanding of the operation of the example of the present invention illustrated in the drawing. If the sensor 2 is altered or replaced, the PROM 20 would, of course, be provided with the characterizing information suitable for the modified sensor 2.

Accordingly, it may be seen that there has been provided, in accordance with the present invention, an improved sensor output signal correction circuit.

The embodiments of the invention in which an exclusive property or privilege is claimed are defined as follows:

1. A sensor correction circuit comprising:
   a process variable sensor means,
   a programmable read-only memory for storing a predetermined number of digital data bits in respective data storage cells,
   a shift register having a plurality of digital bit storage stages at least equal in number to the number of data bits stored in said memory, an output terminal, and a clock signal input terminal,
   first circuit means for connecting each of said storage cells to a respective one of said storage stages,
   clock signal means for connecting said clock signal input terminal to a source of clock signals,
   output means,
   second circuit means for connecting said output terminal to said output means, and
   housing means for enclosing said sensor means, said memory, said register, said clock signal means and said first and second circuit means while allowing access to said clock signal means, said output means and said sensor means.

2. A sensor correction circuit as set forth in claim 1 wherein said clock signal means and said output means each include electrical conduction isolation means.

3. A sensor correction circuit as set forth in claim 1 and further including power supply means having an input and an output, energizing signal source connection means, third circuit means for connecting said output of said power supply means to supply electrical power to said register and fourth circuit means for connecting said input of said power supply means to said energizing signal source connection means, said housing means enclosing said power supply means, said third and fourth circuit means while allowing access to said energizing signal source connection means.

4. A sensor correction circuit as set forth in claim 3 wherein said clock signal means, said output means and said energizing signal source connection means each include electrical conduction isolation means.

5. A sensor correction circuit as set forth in claim 1 wherein said sensor means includes a sensor output terminal means and said housing means is arranged to allow access to said output terminal means.

6. A sensor correction circuit as set forth in claim 5 wherein said sensor means includes a differential pressure means for producing an output signal in response to differential pressure applied thereto, signal amplifying means connected to said pressure means for handling said output signal from said pressure means to produce a representative output signal and fifth circuit means for applying said representative output signal to said output terminal means.

7. A sensor correction circuit as set forth in claim 6 and further including power supply means having an input and an output, energizing signal source connections means, third circuit means for connecting said output of said power supply means to supply electrical power to said register and said signal amplifying means and fourth circuit means for connecting said input of said power supply means to said energizing signal source connection means, said housing means enclosing said power supply means, said third and fourth circuit means while allowing access to said energizing signal source connection means.

8. A sensor correction circuit as set forth in claim 5 wherein said output terminal means includes electrical conduction isolation means for conductively isolating said access to said output terminal means from the interior of said housing means.

9. A sensor correction circuit as set forth in claim 8 wherein said clock signal means and said output means each include electrical conduction isolation means for conductively isolating said access to said clock signal means and said output means from the interior of said housing means.

10. A sensor correction circuit as set forth in claim 1 wherein said digital data bits stored in said memory are representative of sensor correction data suitable for use in correcting output signals from said sensor means representative of a sensed process variable.

11. A sensor correction circuit comprising:
    a process variable sensor arranged to produce an output signal representative of a process variable being monitored by said sensor,
    a non-volatile memory means for storing data suitable for use in correcting said output signal from said sensor,
    output terminal means,
    readout means for selectively reading said data stored in said memory means and applying said data to said output terminal means, where said readout means includes coversion means for converting said data stored in said memory means into a serial format for application to said output terminal means and
    housing means for enclosing said sensor means, said memory means, said output terminal means and said readout means while allowing access thereto.

12. A sensor correction circuit as set forth in claim 11 wherein said memory means includes a single level, multi-bit programmable read-only memory having a plurality of digital data storage cells and said conversion means includes a shift register having digital bit storage stages at least equal in number to the number of said data storage cells and circuit means for connecting each of said storage cells to a respective one of said storage stages.

* * * * *